United States Patent Office 3,366,627
Patented Jan. 30, 1968

3,366,627
METHOD FOR RECOVERING XANTHOSINE PHOSPHATE
Theodore A. Jacob, Westfield, and Ronald A. Vitali, Ridgefield, N.J., assignors to Merck & Co., Inc., Rahway, N.J., a corporation of New Jersey
No Drawing. Filed Jan. 4, 1966, Ser. No. 518,527
6 Claims. (Cl. 260—211.5)

ABSTRACT OF THE DISCLOSURE

Recovery of xanthylic acid from fermentation broths comprising adsorbing the acid on a strongly basic anion exchange resin, eluting with an aqueous solution of an acid, chromatographing the resulting solution over activated carbon, eluting the carbon adsorbate with an aqueous solution of an organic base, precipitating the acid as the barium salt, contacting this salt with a strongly acidic cation exchange resin, and recovering the acid in the form of its alkali metal salt.

---

The present invention relates to the purification of 5'-nucleotides.

More particularly, it relates to the isolation and recovery of the 5'-nucleotide xanthylic acid, also known as xanthosine-5'-monophosphate. The 5'-nucleotides are widely used as seasoning and/or flavoring agents. The nucleotides, in general, are phosphate monoesters of purine or pyrimidine nucleosides and, although structurally different from each other, are so closely related in gross chemical properties that the separation of one from the other represents a formidable task when the requirement for a high-purity product from high-yielding processes is present.

Among the 5'-nucleotides which are presently known are uridylic acid, cytidylic acid, inosinic acid, guanylic acid, adenylic acid and xanthylic acid.

In addition to the property of behaving as a seasoning agent, xanthylic acid may be converted into guanylic acid by the action of xanthosine monophosphate aminase. Likewise, the preparation of xanthylic acid in high yield makes this material available as a relatively inexpensive research tool for use in the study of the production of synthetic polynucleotides which, in turn, may be used in studies on the genetic code, protein synthesis and other aspects of nucleic acid structure.

In accordance with our invention, it is now found that xanthylic acid can be separated from fermentation liquors containing xanthylic acid alone or associated with other 5'-nucleotides by a process employing absorption on anion exchange resins, adsorption on carbon and barium precipitation. Xanthylic acid which, like other 5'-nucleotides, contains both strongly acidic and basic chemical functions, is effectively purified by the present process in high yield. Thus, the process of our invention can be used to recover substantially pure xanthylic acid in economical quantities from fermentation broths produced by xanthylic acid-producing cultures of *Micrococcus glutamicus* such as A.T.C.C. 15971.

In accordance with our invention, a fermentation broth produced by the cultivation in a nutrient medium under aerobic conditions of a culture of *Micrococcus glutamicus* is contacted with anion exchange resin. In carrying out the ion exchange absorption step it is preferable to first separate the fermentation liquor from the cells of the *Micrococcus glutamicus* associated therewith. This may be accomplished by filtration or centrifugation. The clarified fermentation liquor is, as indicated, first contacted with an anion exchange resin to form an adsorbate of xanthosine-5'-monophosphate and the anion exchange resin. The absorbate is subsequently eluted by treatment with an aqueous solution of a strong mineral acid. The eluted xanthylic acid is then chromatographed on a column of granular activated carbon, elution being carried out by the use of an aqueous solution of a weak basic material. Subsequently, the resulting carbon eluate containing the desorbed xanthylic acid is contacted in aqueous solution with barium hydroxide to precipitate the insoluble barium salt of xanthylic acid. The barium salt is then treated in aqueous medium with a strongly acidic cation exchange resin to regenerate the free xanthosine-5'-monophosphate and absorb from solution the barium ion thus released. The desired alkali metal salt of xanthosine-5'-monophosphate is then obtained by separating the aqueous solution of xanthylic acid from the ion exchange resin containing adsorbed barium ion and subsequently neutralizing said acidic aqueous solution using an alkali metal hydroxide or alkoxide to produce an aqueous solution of substantially pure salt of xanthylic acid from which the dry, pure salt may be obtained by evaporation of the water.

It has been found that the process carried out according to this sequence of steps produces a high yield of substantially pure salt of xanthylic acid. Although each of the above steps effects a partial purification of xanthylic acid from other 5'-nucleotides contained in the fermentation solution, it is believed that the particular unique sequence employed in the process of the our invention is necessary to provide the pure product in high yield.

In carrying out the first step of our process, as indicated above, it is preferred to use a fermentation liquor which has been separated from the cells of *Micrococcus glutamicus* or other microorganism. In the instance above mentioned, in which the xanthylic acid is produced by a high-yielding strain of *Micrococcus glutamicus*, the xanthylic acid may be adsorbed, if desired, from the whole fermentation broth, i.e., without first removing the cell bodies from the fermentation liquor. This is possible since the particular strain of xanthylic acid-producing microorganism utilized is one in which the material is produced extracellularly, i.e., the xanthylic acid is excreted directly from the cell bodies into the aqueous culture medium in which they are suspended. The above process, although adapted to a process utilizing fermentation broth having extracellularly-produced xanthylic acid, may also be utilized and applied to the isolation of xanthylic acid from fermentation broths wherein the xanthylic acid is produced within the cell bodies and retained therein. In such instances, however, for the most effective operation of our process it is first necessary to release in some manner the xanthylic acid from the cell bodies of the microorganisms. This is readily accomplished by lysis of the cells using heating, acid treatment, or other conventional methods.

In the first step of our process, the aqueous solution of xanthylic acid is contacted with a strongly basic anion exchange resin. Such resins contain polymerized cycloaromatic compounds as the basic monomer which forms the lattice of the resin, interspersed with quaternary ammonium groups as the reactive site. Typical examples of such quaternary ammonium resins are listed in "The Merck Index," seventh edition, pp. 1579–1585. Included among these are Duolite A-40, Duolite A-42, Duolite A-101, Duolite A-102, Dowex-1, 2, 3 and 21-K, Amberlite IRA-400, IRA-401 and IRA-410. The resin employed in the present process is preferably placed first on the salt cycle, i.e., having the hydroxyl ion of the quaternary ammonium base replaced by the anion of a salt such as chloride, sulfate, acetate, and the like, acetate being preferred. Sufficient resin must be supplied to the fermentation liquor so that the stoichiometric requirements of the aqueous solution are satisfied, i.e., the resin must be present in sufficient quantity to adsorb all of the xanthylic acid anions along with any other anions which have approximately the same absorption rate.

For the purposes of the process described herein, it has been found that essentially all of the xanthylic acid is adsorbed from a typical fermentation broth of *Micrococcus glutamicus* when from 20 to 500 ml. of resin measured in its wet form is added to a liter of fermentation broth.

In a preferred method of operation, approximately 200 ml. of resin is utilized per liter of broth. It has been found that the resin is highly selective in the absorption of xanthylic acid when the resin is placed on the acetate cycle before beginning operation.

The resulting adsorbate is a stable compound and may be purified by washing with water and/or aqueous solution of weak acid, such as acetic acid, propionic acid, and the like. The elution step is carried out by contacting the ion exchange resin adsorbate with an aqueous solution of a strong acid, such as hydrochloric, sulfuric, nitric, trifluoroacetic and phosphoric acid. A preferred eluting agent in this case is an aqueous solution of hydrochloric acid having a concentration of between 0.1 to about 1 N in concentration.

The acidic solution of xanthylic acid is then chromatographed by passage over a column of granular activated carbon. Although the amount of carbon utilized is not critical in the separation of xanthylic acid from the other impurities, it is preferred that the weight of carbon contained in the column be at least 20 times the estimated amount of xanthylic acid in the feed solution to be purified. However, ratios of from as low as 10 parts by weight of carbon to 1 of xanthylic acid and as high as 100 to 1 may be utilized.

The solution is passed through the chromatographic column at the maximum rate, the limiting feature of the chromatography being the permeability of the chromatographic column to the aqueous solution being applied. The column, after adsorption of the xanthylic acid thereon, is washed with water made slightly acid to a pH of about 1 to 4, thus removing inorganic impurities such as salts and other interfering ions. The column is then eluted with an aqueous solution of a weak base. A preferred eluting agent is a 5% aqueous solution of pyridine, although related compounds such as lutidine, collidine, benzylamine and aqueous alcoholic solutions of ammonia may also be effectively employed.

The eluate fractions containing the major portion of the xanthosine monophosphate are selected by the measurement of the ultraviolet absorption of a sample of eluate solution neutralized to pH 7 with 0.1 N sodium hydroxide solution at a wavelength of 250 m$\mu$. The molar extinction coefficient for an authentic sample of the disodium salt of xanthylic acid under these conditions is known to be 8,450. The amount of xanthylic acid is also quantitatively estimated using a microbiological tube dilution assay employing the xanthosineless auxotroph *B. subtilis*.

This particular assay organism responds to xanthine as well as guanine compounds and thus is effective in the case of xanthylic acid-containing broths which have no guanine, guanosine or guanosine-5'-monophosphate present. The preferred broths have been found to contain none of these materials. The details of the assay are as follows.

Into tubes, 20 by 175 mm. were placed 0.1 ml. samples of centrifuged broths or purified fractions. Similar tubes were prepared with increasing amounts of disodium XMP standard (Pabst Laboratories, Milwaukee, Wis.), in a total volume of 0.1 ml. The standard is presumably made commercially by chemical deamination of GMP. The standard curve contained XMP at 0, 20, 40, 60 and 100 $\mu$g. per tube. To each tube was added 0.1 ml. of 2 N sulfuric acid. The tubes were autoclaved at 121° C. for 15 minutes and were cooled. After neutralization with 5 ml. of 0.04 N potassium hydroxide, 5 ml. of double-strength assay medium (Demain, 1964) were added to each tube. After autoclaving again, each tube received 0.05 ml. of a spore suspension of *B. subtilis* MB-1358. The tubes were incubated at 37° C. for 16 hours on a rotary shaking machine, and the absorbance was determined in a Spectronic-20 colorimeter at 660 m$\mu$. The assay results are reported in terms of milligrams of disodium XMP per milliliter of broth. Although xanthine and xanthosine would be measured in such an assay, paper chromatography showed that these were only minor components of the XMP-containing broths.

*Paper chromatography.*—Paper chromatographic examination of broth was done on circular sheets of whatman No. 4 paper in the following four systems: (A) n-propanol-ammonium hydroxide-water (6:3:1); (B) isobutyric acid-ammonium hydroxide-water (57:4:39); (C) saturated ammonium sulfate - isopropanol - water (19:2:19); (D) isopropanol - hydrochloric acid - water (65:17:18). Purified material was chromatographed in the descending direction on rectangular sheets of whatman No. 1 paper by use of the following systems: (E) n-butanol-acetic acid-water (5:2:3) and (F) isopropanol-ammonium hydroxide-water (7:1:2). After development and drying of the chromatograms, the intensities of the bands were estimated by examination with an ultra-violet light source.

*Spot tests.*—A periodate-benzidine spray modified from Cifonelli and Smith (1954) by A. C. Page, Jr. (personal communication), was used to differentiate 5'-ribonucleotides (positive) from 2'- and 3'-ribonucleotides (negative) and from deoxyribonucleotides (negative).

The selected eluate fractions from the carbon chromatography are evaporated under reduced pressure to a relatively small volume and neutralized with an aqueous solution of barium hydroxide to a pH of about 8.0, whereupon the barium salt of xanthosine-5'-monophosphate precipitates from solution and is separated by filtration. The separated barium salt is thoroughly washed with water to remove occluded impurities and organic materials not precipitated by this method. The precipitate is then suspended in water and contacted with an excess amount of a strongly acidic cation exchange resin to effect adsorption of the barium and release of the xanthylic acid as the free acid in solution. The cation exchange resin containing the adsorbed barium is then removed from the aqueous suspension by filtration and the filtrate containing the substantially pure xanthylic acid contacted with an alkali metal hydroxide or alkoxide such as sodium or potassium hydroxide, methoxide, ethoxide, or potassium ethoxide, methoxide or propoxide, whereupon there is formed in solution the substantially pure disodium or dipotassium salt of xanthosine-5'-monophosphate, which is recovered in solid form by evaporation or by lyophilization.

The product produced in this manner is substantially pure when examined by ultraviolet assay, table chromatographic assay and biological assay.

PREPARATION OF FERMENTATION BROTH CONTAINING XANTHOSINE-5'-MONOPHOSPHATE

The fermentation production medium is composed of the following compounds and sufficient water to provide a one-liter volume and is produced as follows.

| Component: | Grams |
|---|---|
| Enzymatic digest of casein | 6.0 |
| Urea | 5.0 |
| $(NH_4)_2HPO_4$ | 9.0 |
| $(NH_4)_2SO_4$ | 6.0 |
| KCl | 1.5 |
| $K_2SO_4$ | 1.5 |
| $MgSO_4 \cdot 7H_2O$ | 0.75 |
| $CaCl_2 \cdot 2H_2O$ | 0.15 |
| $MnSO_4 \cdot H_2O$ | 0.04 |
| $FeSO_4 \cdot 7H_2O$ | 0.01 |
| Adenine | 0.06 |
| Guanine·HCl | 0.075 |
| Thiamine | 0.001 |
| Biotin | 0.0001 |

The pH of the aforesaid is 7.6, and then 5.0 grams of calcium carbonate are added thereto. Twenty ml. of 5 liters of said fermentation medium is dispensed into each of 250 Erlenmeyer flasks, autoclaved for 10 minutes at 120° C. and then cooled to about 28° C. Then, after the sterilization thereof, there is added to each flask 2.5 ml. of a separately and previously autoclaved aqueous solution containing 1.6 grams of dextrose. The water used is deionized charcoal-treated water.

The fermentation medium in each of said flasks is inoculated with 0.5 ml. of said previously-prepared seed growth suspension of "MB-1809," A.T.C.C. 15971, and then incubated at 28° C. for a period of 4 days on a rotating 220 r.p.m. shaker. At the end of this period, the contents of the 250 flasks are pooled and then centrifuged to separate the cells therefrom, and the supernatant broth is recovered. The recovered supernatant broth measured 4,500 mls., had a pH of 6.3 and contained 16.2 grams (bioassay) and also 20.0 grams (UV) of assayable xanthylic acid in a total solids content of 167 grams in said supernatant broth.

The following examples are presented to illustrate the methods of carrying out the present invention.

*Example 1*

The supernatant broth (4500 ml.) obtained in accordance with the above procedure, and which contained 16.2 grams of xanthosine monophosphate disodium salt by bioassay, is percolated through a chromatographic column containing 1 liter of DOWEX 1×2 resin on the acetate cycle at a rate of 50 ml./min. to adsorb the xanthosine monophosphate from solution. The ion exchange resin with adsorbed xanthosine monophosphate (XMP) is washed by using 2 liters of cold water and then, successively, with 2 liters of 0.5 N acetic acid. The desired product is eluted using 10 liters of aqueous 0.1 N hydrochloric acid and the eluate collected in 750 ml. fractions. On analysis of each fraction by ultraviolet absorption, bioassay and paper chromatography, it is found that fractions 17 and 18 contain the major part of the xanthosine-5'-monophosphate. The eluate is then neutralized to pH 7 with aqueous sodium hydroxide solution.

Neutralized fractions containing the major portion of xanthosine-5'-monophosphate are cooled in an ice bath and adjusted to pH 2.5 with concentrated hydrochloric acid, and the resulting solution of xanthosine-5'-monophosphate is percolated through a column containing 300 g. granular activated carbon at a rate of 50 ml./min., during which time the major portion of the xanthosine-5'-monophosphate is adsorbed on the granular carbon. The carbon adsorbate column is then washed with 4 liters of cold 0.005 N aqueous hydrochloric acid to remove any inorganic salts associated with the desired xanthosine-5'-monophosphate. After removal of the salt from the carbon adsorbate column, the column is then eluted with 8 liters of a cold aqueous solution containing 5% of pyridine by volume. Eluate fractions of 750 ml. volume were collected and it was found that the major portion of the xanthosine monophosphate disodium salt is contained in fractions 10–14, inclusive.

The fractions containing the major portion of xanthosine monophosphate are combined and concentrated in vacuo at a temperature maintained below 40° C. to a volume of 130 ml. The resulting solution of disodium salt of xanthosine-5'-monophosphate is then cooled to ice water temperature and contacted with sufficient sulfonic acid ion exchange resin to reduce the pH of solution to about 1.7 and convert the disodium salt into the free phosphate form. The solution of xanthosine-5'-monophosphate is then recovered by filtering off the cation exchange resin and washing with water. The filtrate and the water wash containing the free xanthosine-5'-monophosphate are then combined and neutralized to pH 8.0 with a saturated aqueous solution of barium hydroxide to precipitate the barium salt of xanthosine-5'-monophosphate. The barium salt is recovered by filtration and is then washed successively with cold water, methanol, and ether.

The precipitate is suspended in 400 ml. of cold water and the suspension treated with sufficient resin on the hydrogen cycle to produce a pH of 1.4 in the solution, during which time the barium is adsorbed on the resin and the resin containing adsorbed barium removed by filtration and washed with water. The filtrate and washings containing the free xanthosine-5'-monophosphate are then combined and neutralized to a pH of 7.8 using aqueous sodium hydroxide, whereupon there is formed in solution the disodium salt of xanthosine-5'-monophosphate having substantially all the impurities removed therefrom. Lyophilization of this solution produces solid xanthosine-5'-monophosphate disodium salt in substantially pure form as shown by ultraviolet absorption, bioassay and paper chromatography.

Various changes and modifications of the invention can be made, and to the extent that such variations incorporate the spirit of this invention, they are intended to be included within the scope of the appended claims.

We claim:

1. The process for recovering xanthosine-5'-monophosphate from an aqueous fermentation broth containing the same which comprises the following steps:
   (a) contacting a fermentation broth containing xanthosine-5'-monophosphate with a strongly basic anion exchange resin deriving its exchange capacity from quaternary ammonium groups to form an adsorbate of xanthosine-5'-monophosphate on said resin;
   (b) contacting said ion exchange resin adsorbate with an aqueous solution of an acid to elute said xanthosine-5'-monophosphate;
   (c) contacting the resulting eluate with activated carbon to form an adsorbate of xanthosine-5'-monophosphate on carbon;
   (d) contacting said carbon adsorbate with a dilute aqueous solution of an organic base to elute xanthosine-5'-monophosphate in partially purified form;
   (e) contacting the resulting eluate with an aqueous solution or barium hydroxide to form a precipitate of barium xanthosine-5'-monophosphate and recovering said barium salt;
   (f) contacting said recovered barium salt in aqueous suspension with a strongly acidic cation exchange resin whereby the barium ion is adsorbed and the barium salt of xanthosine-5'-monophosphate is converted to the free acid in solution;
   (g) separating and neutralizing said solution with a member selected from the group consisting of alkali metal hydroxides and alkali metal lower alkoxides to form an aqueous solution of substantially pure alkali metal salt of xanthosine-5'-monophosphate.

2. The process according to claim 1 wherein step (b) thereof is carried out utilizing a strong mineral acid as the eluting agent.

3. The process according to claim 1 wherein the organic base employed in step (d) thereof is pyridine.

4. The process according to claim 1 wherein the strongly acidic cation exchange resin employed is one which derives its exchange capacity essentially from sulfonic acid substituents.

5. The process according to claim 1 wherein step (b) is carried out employing a dilute solution of a strong mineral acid and the base employed in step (d) thereof is a member selected from the group consisting of a volatile amine and ammonia.

6. The process according to claim 2 wherein the strong mineral acid employed is hydrochloric acid.

References Cited

UNITED STATES PATENTS 3,278,517   10/1966   Marumo et al. _____ 260—211

LEWIS GOTTS, *Primary Examiner.*

J. R. BROWN, *Assistant Examiner.*